S. C. CALOW.
ELECTRICAL HEATER FOR INCUBATORS.
APPLICATION FILED DEC. 14, 1918.
1,322,161.
Patented Nov. 18, 1919.
2 SHEETS—SHEET 1.
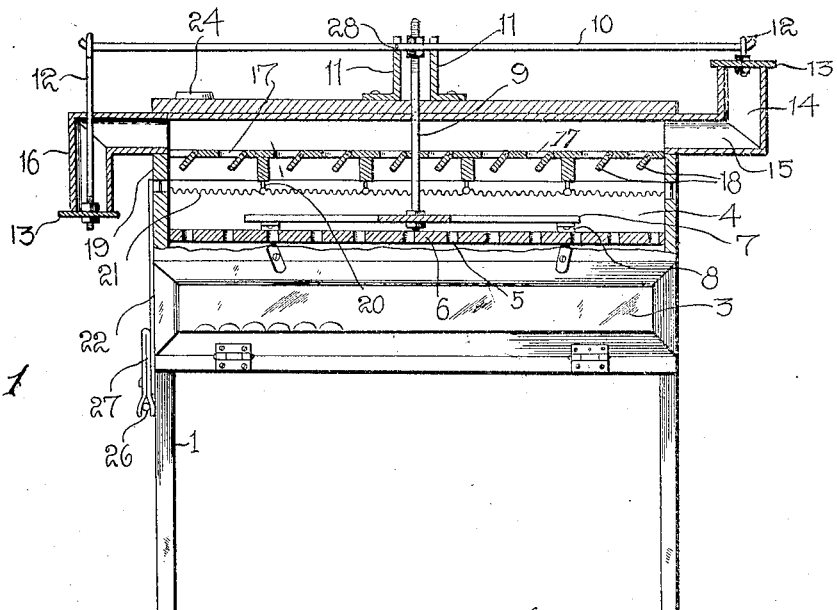
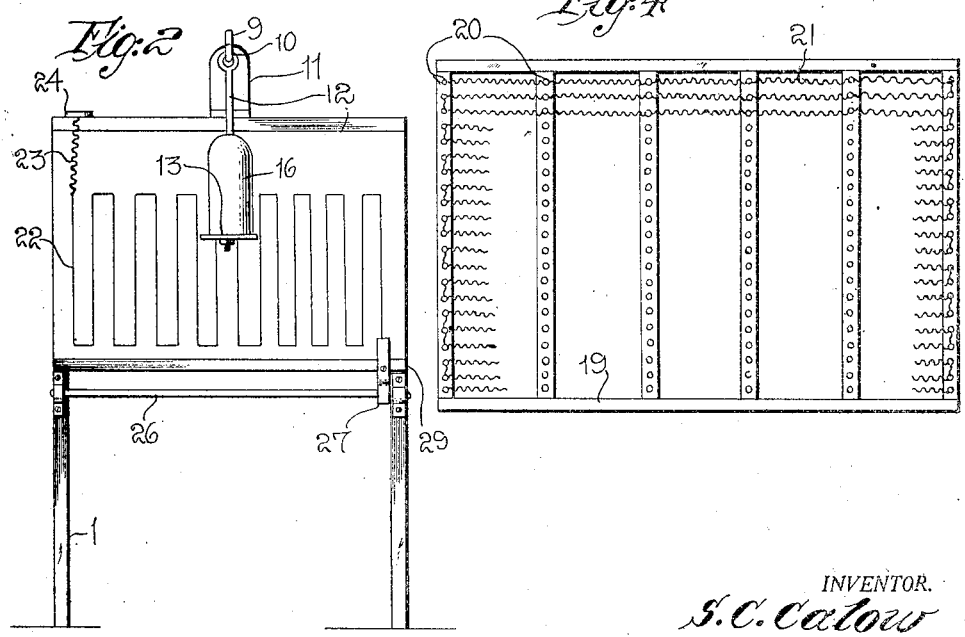

S. C. CALOW.
ELECTRICAL HEATER FOR INCUBATORS.
APPLICATION FILED DEC. 14, 1918.
1,322,161. Patented Nov. 18, 1919.
2 SHEETS—SHEET 2.
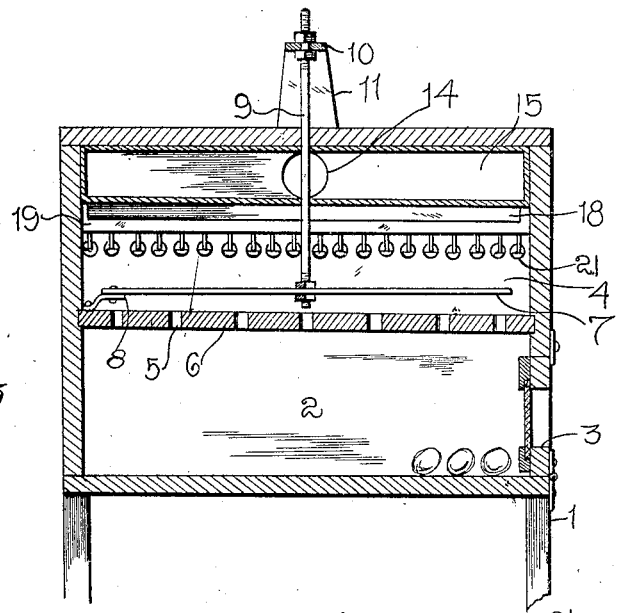
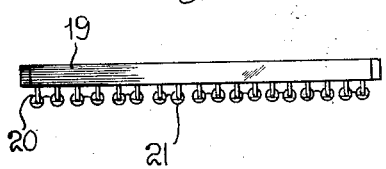
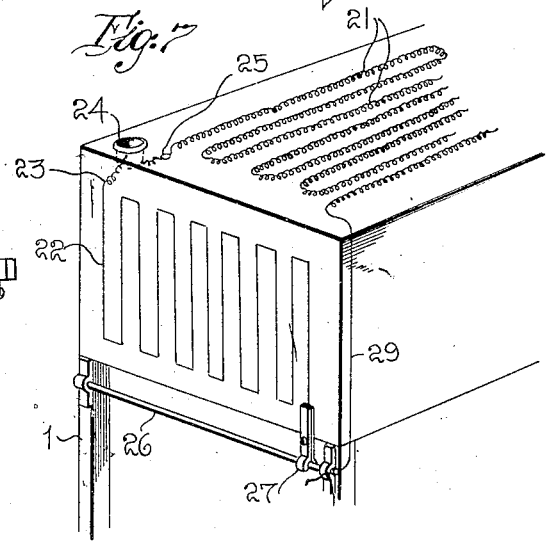
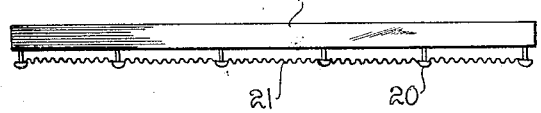
INVENTOR.
S. C. Calow
BY
Lacy & Lacy,
ATTORNEY.

UNITED STATES PATENT OFFICE.

STANLEY C. CALOW, OF CALGARY, ALBERTA, CANADA, ASSIGNOR OF ONE-HALF TO SAMUEL BENNETT, OF CALGARY, CANADA.

ELECTRICAL HEATER FOR INCUBATORS.

1,322,161.      Specification of Letters Patent.      Patented Nov. 18, 1919.

Original application filed June 1, 1918, Serial No. 237,768. Divided and this application filed December 14, 1918. Serial No. 266,791.

*To all whom it may concern:*

Be it known that I, STANLEY C. CALOW, a subject of the King of Great Britain, residing at Calgary, in the Province of Alberta and Dominion of Canada, have invented certain new and useful Improvements in Electrical Heaters for Incubators, of which the following is a specification.

This invention relates to the means for heating incubators, the present application being a division of an application filed by me June 1, 1918, Serial No. 237,768.

In the accompanying drawings,

Figure 1 is a view, partly in front elevation and partly in longitudinal section, of an incubator embodying my invention;

Fig. 2 is an end elevation of the same;

Fig. 3 is a transverse section;

Fig. 4 is a bottom plan view of the heater;

Fig. 5 is an end elevation of the same;

Fig. 6 is a side elevation thereof;

Fig. 7 is a diagrammatic perspective showing the heating circuit.

In carrying out my invention, I employ a supporting frame or casing which may be of the same general characteristics as those of other incubators now in common use, being supported upon legs 1 and having an egg chamber 2 closed by a glazed door 3 so that the condition of the eggs may be observed at all times without requiring an exposure of the same to the chilling influence of the outside air. Above the egg chamber 2, is the heating chamber 4 and the back, sides and top of the egg and heating chambers may be constructed with double walls providing a dead air chamber or other heat insulating construction as will be readily understood. The egg chamber 2 is of the usual construction and may be of such dimensions as to accommodate a single layer of eggs upon its floor or may accommodate a plurality of trays upon which the eggs are placed as may be preferred and as will be readily understood.

The heating chamber is in communication with the egg chamber through a series of openings 5 formed through the partition 6 which separates the heating chamber from the egg chamber, and within the heating chamber is provided a thermostatic plate 7 which may be supported at its rear edge by brackets 8 secured upon the partition 6, or to the back wall of the incubator casing, while its front edge is free, as shown most clearly in Fig. 3. A connecting rod 9 has its lower end secured to the thermostatic plate 7, at the center of the same, and extends up through the top of the incubator casing above which it is connected in any convenient manner to a vibratory rod 10 which is supported upon bearings or brackets 11 provided upon the top of the incubator casing so that it may rock as the thermostatic plate 7 rises and falls. The rod 10 extends from the brackets 11 toward and beyond the ends of the incubator casing and from its ends are suspended the damper rods 12, having damper plates 13 upon their lower ends. One of these damper plates rests upon the upturned end 14 of the ventilating tube 15, while the other damper plate bears against the lower end of the downturned elbow 16 of said ventilating tube. The ventilating tube 15 extends through the incubator casing immediately below the top of the same, and within the incubator it takes the form of an elongated chamber having transverse slots 17 in its bottom through which the hot impure air from the heating chamber may pass. Shutters 18 may be provided for these slots so that they may be opened or closed and thereby regulate the speed at which the air will pass into the ventilating tube, as will be readily understood, and it will also be understood that the rod 10 is so mounted upon the brackets 11 that normally it will be in a horizontal position with the damper plates bearing against and closing the ends of the respectively adjacent elbows or terminals of the ventilating tube.

Within the incubator and immediately below the ventilating tube, I provide a frame 19 which may be of any convenient construction and is provided with a plurality of depending insulators 20 upon which are strung resistance coils 21 extending longitudinally of the heating chamber. Upon one end wall of the casing, I provide a conducting wire 22 which is arranged in a series of connected reversed bends so that it constitutes, in effect, a rheostat or controlling resistance. This conducting wire 22 is connected by a conductor 23, indicated diagrammatically in Figs. 2 and 7, with a socket 24 which may receive a plug for the transmission of current from an ordinary house connection or from any other source of electrical energy. One side of this socket 24 is connected by a conductor 25, with the resistance coil 21, the opposite end of the coil being connected by a conductor 29 with a rod 26 secured upon the end of the incubator. A slide 27 mounted upon the said rod 26 and having one end disposed over the lower branches of the conducting wire 22 establishes electrical connection between the rod 26 and the said wires and it will be readily understood that by shifting this slide longitudinally of the rod, one or more coils or branches of the conductor 22 may be cut out and the strength of the current entering the heating coils 21 thereby regulated.

It is thought the operation will be readily understood from the foregoing description, taken in connection with the accompanying drawings. The normal position of the parts is shown in Fig. 1, the ends of the ventilating tube being closed by the dampers 13 so that when the current is turned on, the heating coils 21 will become hot and raise the temperature of the air in the heating chamber. As there will be a constant circulation of air through the heating and egg chambers, the temperature of the egg chamber will be raised so that the hatching process will be performed. The thermostat will, of course, be of such material that it will remain in its lowest position until the temperature in the heating chamber becomes higher than the predetermined degree. When the heat rises above the predeterminal degree, the thermostatic plate will swing upwardly about the brackets 8 and will thereby push upwardly upon the connecting rod 9 so that the supporting lever rod 10 will be rocked about its pivot 28 and consequently lift the upper damper 13 and depress the lower damper so that the hot, foul air may escape. When the temperature drops to normal or below normal, the parts will automatically return to their normal positions and the heating process then continue. It will be readily noted that I have provided a very simple and easily maintained or repaired apparatus by the use of which the temperature in an incubator will be kept uniform. Should the ventilator remain open for an abnormal or unusual period it will indicate that the temperature in the heating chamber is being kept at an excessively high figure and it may then be easily reduced by properly shifting the slide 27. The use of the slide 27 also permits the operator to start the operation of the incubator at a low degree and gradually increase the temperature as may seem advisable or experience may dictate.

Having thus described my invention, what is claimed as new is:

1. The combination of a casing containing a heating chamber, a plurality of electric heating coils extending longitudinally of the heating chamber, a conductor mounted upon the casing and disposed in a series of opposed bends, a stationary conductor for connecting one terminal of said first-mentioned conductor with a source of energy a connection between the coils and the source of energy, and a movable conductor arranged to connect bends in the first-mentioned conductor with the heating coils.

2. The combination of a casing containing a heating chamber, a plurality of electrical heating coils disposed longitudinally within the heating chamber, a metallic rod supported upon the casing and connected electrically with the coils, a conductor comprising a plurality of parallel branches connected alternately at their opposite ends mounted upon the casing, one of the said branches being adapted to be connected to a source of energy, a connection between the heating coils and the source of energy, and a slide mounted upon the said rod and adapted to engage successively the branches of the first-mentioned conductor.

In testimony whereof I affix my signature.

STANLEY C. CALOW. [L. S.]